United States Patent [19]

Hakansson et al.

[11] 4,253,334
[45] Mar. 3, 1981

[54] DEVICE FOR GRIPPING AND FOR READING OF TEMPERATURE VALUES OBTAINED BY MEANS OF A TEMPERATURE MEASURING DEVICE

[75] Inventors: Hakan B. Hàkansson; Lennart P. E. Persson, both of Lund, Sweden

[73] Assignee: Gambro AB, Sweden

[21] Appl. No.: 131,078

[22] PCT Filed: Jun. 1, 1979

[86] PCT No.: PCT/SE78/00013

§ 371 Date: Mar. 3, 1980

§ 102(e) Date: Jun. 1, 1979

[87] PCT Pub. No.: WO80/00192

PCT Pub. Date: Feb. 7, 1980

[51] Int. Cl.³ .................................................. G01K 7/22
[52] U.S. Cl. ................................ 73/362 AR; 128/736
[58] Field of Search ........ 73/362 SC, 362 AR, 362 R; 128/736

[56] References Cited

U.S. PATENT DOCUMENTS

| 3,082,625 | 3/1963 | Zimmerman | 73/362 AR |
|---|---|---|---|
| 3,260,114 | 7/1966 | Drolet, Jr. | 73/362 SC |
| 3,349,896 | 10/1967 | Ensign et al. | 73/362 AR |
| 3,356,980 | 12/1967 | Roberts | 73/362 AR |
| 3,402,378 | 9/1968 | Catlin et al. | 73/362 AR |
| 3,477,292 | 11/1969 | Thornton | 73/362 AR |
| 3,485,102 | 12/1969 | Glick | 73/362 AR |
| 3,593,581 | 7/1971 | Beightol | 73/362 AR |
| 3,642,008 | 2/1972 | Bolduc | 128/416 |
| 3,681,993 | 8/1972 | Campton | 73/362 AR |
| 3,729,998 | 5/1973 | Mueller et al. | 73/362 AR |
| 3,776,040 | 12/1973 | Gould | 73/362 AR |
| 3,822,593 | 7/1974 | Oudewaal | 73/362 AR |
| 3,884,219 | 5/1975 | Richardson | 128/724 |
| 3,949,609 | 4/1976 | Hammerslag | 73/362 AR |
| 3,999,537 | 12/1976 | Noiles | 128/736 |
| 4,095,467 | 6/1978 | McGlynn | 73/362 AR |

FOREIGN PATENT DOCUMENTS 1339098 11/1973 United Kingdom .............. 73/

*Primary Examiner*—Donald O. Woodiel
*Attorney, Agent, or Firm*—Lerner, David, Littenberg & Samuel

[57] ABSTRACT

The invention relates to a device for the gripping of a temperature measuring device and for the reading of measuring values obtained with this device. The said temperature measuring device comprises a temperature-sensitive sensor, whose electrical properties, e.g. the resistance, vary with the temperature, e.g. a thermistor, and which is connected via two contacts to two electric conductors arranged on a support, which electric conductors terminate in two contact surfaces at the end remote from the sensor.

An arrangement in accordance with the invention is intended mainly to be used for medical temperature measuring, characterized by at least two measuring contact surfaces which can be coupled together with the said contact surfaces, arranged on the inside or insides of the jaws or a tonglike construction. These measuring contact surfaces constitute a circuit which in addition comprises a source of energy, a display unit and means for the conversion of the measuring value obtained to a value which can be read on the display unit.

19 Claims, 35 Drawing Figures

DEVICE FOR GRIPPING AND FOR READING OF TEMPERATURE VALUES OBTAINED BY MEANS OF A TEMPERATURE MEASURING DEVICE

TECHNICAL FIELD

The present invention relates to a device for the gripping of a temperature measuring device and for the reading of measuring values obtained with the device, this temperature measuring device comprising a temperature-sensitive sensor, whose electrical properties, e.g. the resistance, vary with the temperature, e.g. a thermistor, and which is connected via two contacts to two electric conductors arranged on a support, which electric conductors terminate in two contact surfaces at the end remote from the sensor.

The device in accordance with the invention is intended mainly to be used for medical temperature measurement. It will be clear, however, to those versed in the art that it can also be used in other circumstances, e.g. in purely industrial applications.

BACKGROUND ART

An embodiment of the device in accordance with the invention is specially adapted for temperature measuring devices of the type which is described in the Swedish patent applications 78.03046-7 (U.S. patent application Ser. No. 779,152) now U.S. Pat. No. 4,200,970, 78.04199-3 (U.S. patent application Ser. No. 787,422) and . . . (U.S. patent application Ser. No. 879,183).

Figures 1, 2, 3:
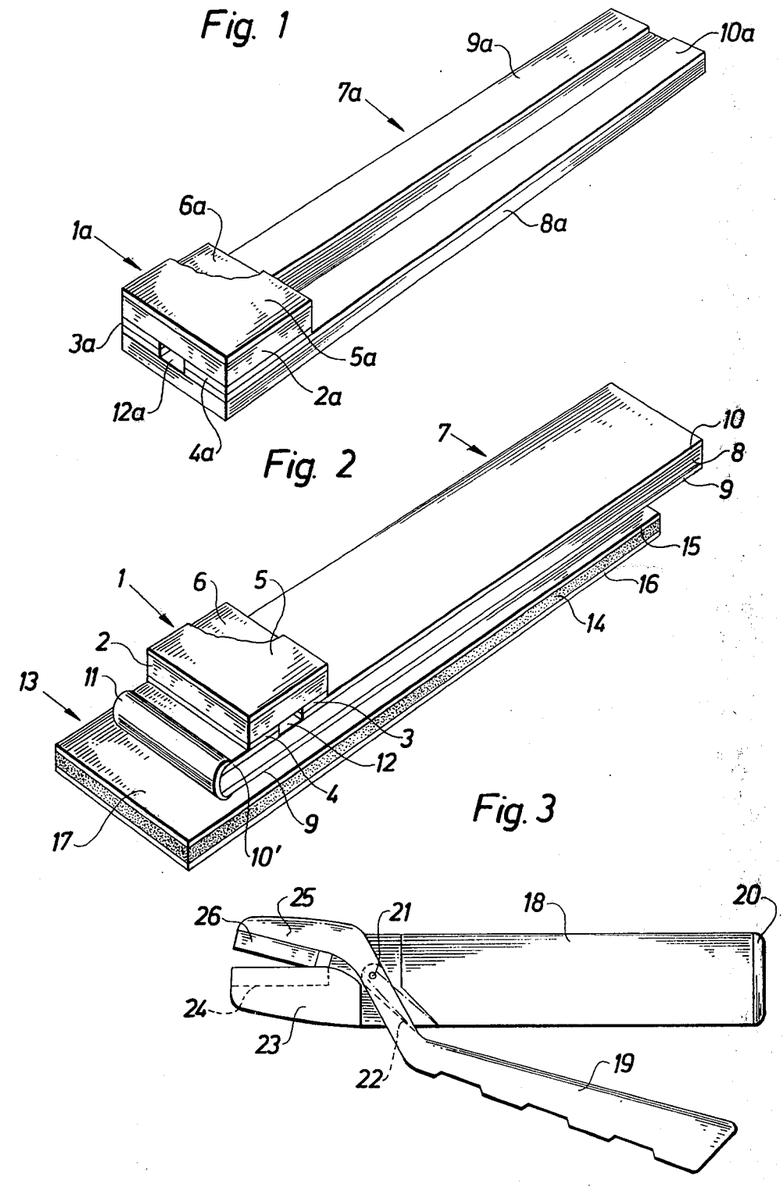
FIG. 1 shows a first example of a temperature measuring device which is suitable for use together with the device in accordance with the invention.
FIG. 2 shows a second example of such a temperature measuring device suitable for use together with the device in accordance with the invention.
FIG. 3 shows a device in accordance with the invention especially adapted for utilization together with the temperature measuring device in accordance with FIG. 1.
Figure 4:
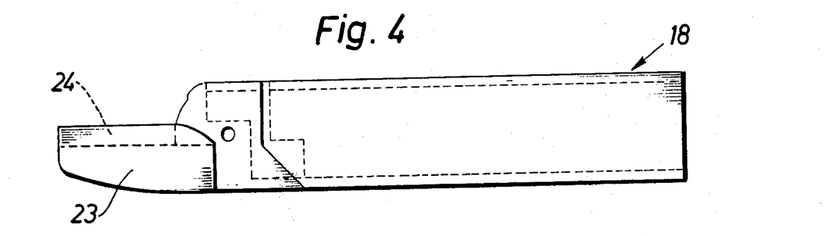
FIGS. 4–7 show four views perpendicular to one another of a component part of the device according to FIG. 3.
Figure 5:
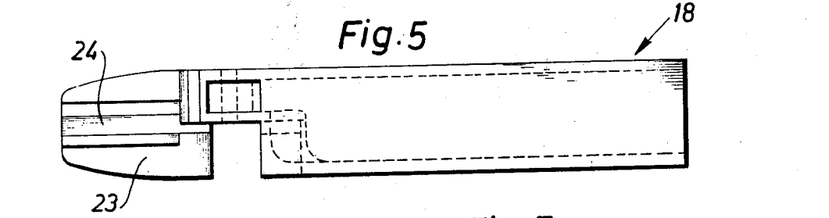
Figure 6:
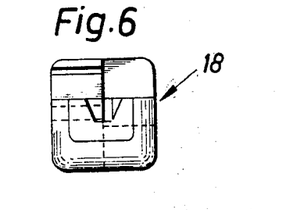
Figure 7:
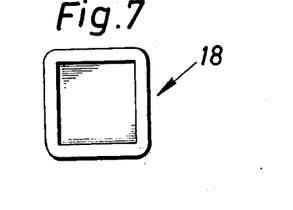

Another embodiment of the subject of the invention is specially adapted for a temperature measuring device which is described in detail in the PCT application SE 78 0012 . . . submitted at the same time, which describes a simplified temperature measuring device and a method for the manufacture of such a device. The latter temperature measuring device is also shown in FIG. 2 of the drawings discussed below.

DISCLOSURE OF THE INVENTION

The device in accordance with the invention is characterized by at least two measuring contact surfaces which can be coupled together with the said contact surfaces arranged on the inside or insides of the jaws of a tong-like construction, these measuring contact surfaces constituting part of a circuit which in addition comprises a source of energy, a display unit together with means for the conversion of the measuring value obtained to a value which can be read on the display unit.

If the device in accordance with the invention is used for medical temperature measurement, the tonglike construction enables the user to grip and to read very reliably and rapidly a temperature measuring device placed, for example, in the mouth of a patient. At the same time this gripping and reading can take place in a satisfactorily hygienic manner.

In cases where the said temperature measuring device has two electric conductors arranged on one and the same side of a support, each jaw of the tonglike construction can be provided on its inside with two measuring contact surfaces for the coupling together with the respective contact surfaces on the electric conductors. These contact surfaces are appropriately coupled together two and two with one from each jaw in such a manner that the temperature measuring device can be introduced with either side up.

In the case where the temperature measuring device is designed so that its electric conductors are arranged on opposite sides of a striplike support, each jaw of the tonglike construction can be provided on its inside with only one measuring contact surface.

The temperature measuring device used is appropriately made as small and simple as possible, so that it can be thrown away after use. The device for gripping and reading of the temperature measuring device however is adapted so as to be suitable for a normal hand. Consequently, it is appropriate to provide it with means for guidance of the temperature measuring device and its contact surfaces so that they may be led to make reliable contact with the measuring contact surfaces in the same.

The said means for guiding the temperature measuring device and its contact surfaces may consist, for example, of a substantially V-shaped groove inside one of the jaws and a corresponding projection on the inside of the other jaw.

The abovementioned V-shaped groove and corresponding projection are appropriately designed so that their cross-section diminishes towards the interior of the jaw and corresponds farthest in to the width of the temperature measuring device used.

The device in accordance with the invention can be adapted so that its closes around the temperature measuring device used against the effect of a spring. In practice, however, it has been found appropriate if the jaws are adapted so that they are opened against the effect of a spring, which on closing of the jaws produces a certain minimum contact pressure between measuring contact surfaces of the device and corresponding contact surfaces of the temperature measuring device used.

The tonglike construction appropriately comprises a housing-like casing which encloses the said source of energy, e.g. a battery, the said means for conversion of the measuring value obtained, together with the said display unit which comprises an outer reading window, the casing forming one jaw, whilst the other jaw is formed by a finger grip part which is spring-mounted in the casing.

TEMPERATURE MEASURING DEVICES USABLE IN ASSOCIATION WITH THE INVENTION

In FIG. 1 a temperature measuring device is shown which is usable in association with the invention. However, in FIG. 2 a preferred temperature measuring device is shown, and this will therefore be described first.

It consists of a sensor 1 which in the example shown is constituted of a thermistor. This thermistor consists of an inner ceramic material 2, whose electric resistance varies with the temperature. On its underside the thermistor is provided with two contacts 3 and 4, which for example may consist of a thin layer of silver. Similarly, the thermistor is provided on its upper side with a silver contact 5 intended for trimming. The trimming may take place in such a manner that a small area 6 is removed from the contact by mechanical treatment, e.g. shot peening or with the help of a laser beam.

The thermistor is arranged on a support 7 which consists of an inner plastic material 8 with outer metal coatings 9 and 10. These metal coatings may, for example, consist of copper. At its front end, that is to say, at the end provided with the sensor, the support 7 is short-circuited by a soldering 11 in such a manner that the metal coating 9 is in contact with a part 10' of the upper layer 10. This part 10' of the upper metal coating 10 is separated from the rest of this metal coating by a cut 12 which is intended to isolate electrically the two contacts 3 and 4 from one another.

The support 7 with the thermistor 1 described above in turn is placed on a somewhat broader strip 13. This strip 13 may consist of an inner cardboard material 14 with outer plastic coatings 15 and 16. The support 7 is placed so that the thermistor 1 is fully located within the surface 17 of the somewhat broader strip 13 carrying the support 7. The opposite end of the support on the other hand is arranged so that it projects beyond the somewhat broader strip 13. The idea behind this is that the part of the total construction shown to the left in FIG. 2 should be capable of being dipped in an insulating plastic coating, so that the thermistor 1, the connecting contacts 3,4 and 5 together with at least the nearest parts of the electric conductors 9 and 10 are enwrapped in a tight manner together with the corresponding end of the somewhat broader strip 13. This plastic wrapping may be made relatively thin with the help of transparent material and is therefore not shown in FIG. 2. The sterile package, into which the construction is finally to be packed until its use, is also not shown.

The measuring device in accordance with FIG. 1 corresponds in principle to that according to FIG. 2. Consequently, the same reference numerals have been used, but with the addition of the letter a. The main difference is that the two electric conductors 9a and 10a are arranged on one and the same side of the same supporting plastic layer 8a. Furthermore, this construction lacks the plastic-coated supporting sheet 13 of cardboard which is present in the construction according to FIG. 2.

DESCRIPTION OF A FIRST EMBODIMENT OF THE DEVICE IN ACCORDANCE WITH THE INVENTION

In FIGS. 3–12 a first embodiment of the device in accordance with the invention is described. This first embodiment is mainly adapted to the temperature measuring device shown in FIG. 1 which has its contacts 9a and 10a arranged on one and the same side of a support 8a.

Figure 8:
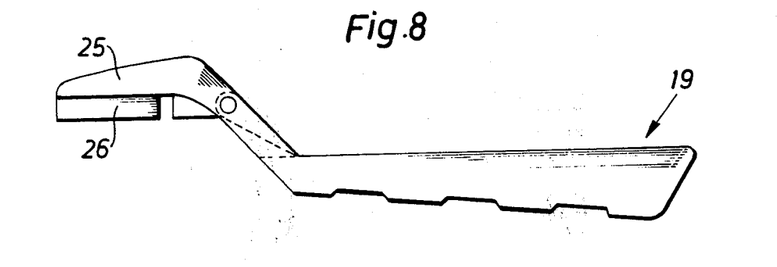
FIGS. 8, 9 and 10 in the same manner show three views perpendicular to one another of a second component part of the device according to FIG. 3.
Figure 9:
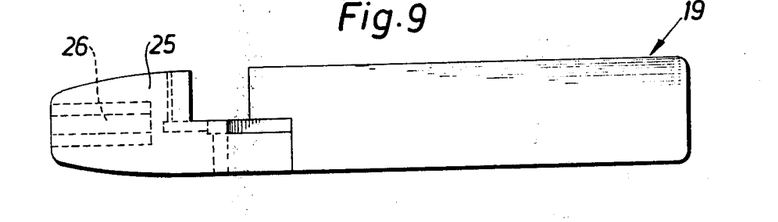
Figures 10, 11, 12, 13:
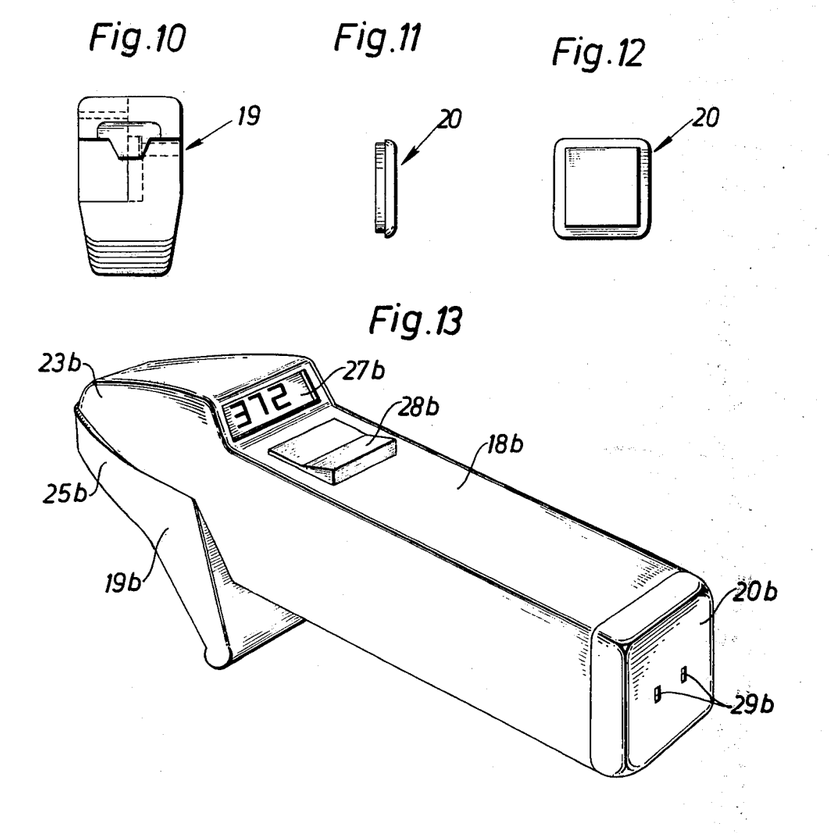
FIGS. 11 and 12 in the same manner show two views perpendicular to one another of a third component part of the device according to FIG. 3.
FIG. 13 shows a preferred embodiment of the device in accordance with the invention adapted for utilization together with the temperature measuring device according to FIG. 2.
Figure 14:
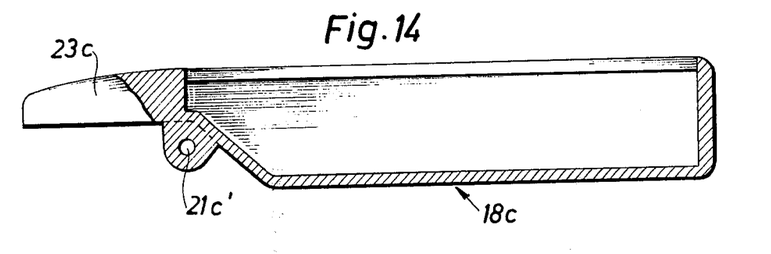
FIGS. 14–17 show three views perpendicular to one another, partly in section, of a casing substantially corresponding to the shell shown in FIG. 13, but modified a little with regard to the outer shape.
Figure 15:
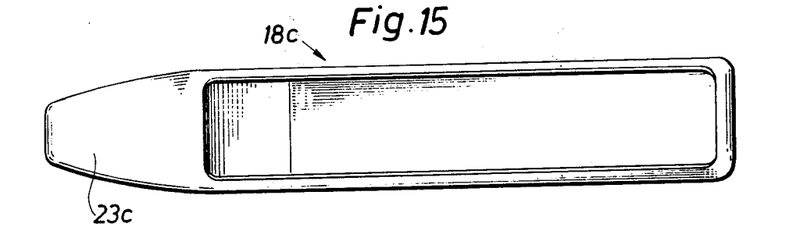
Figure 16:
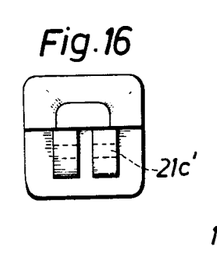
Figures 17, 18, 20, 21, 22:
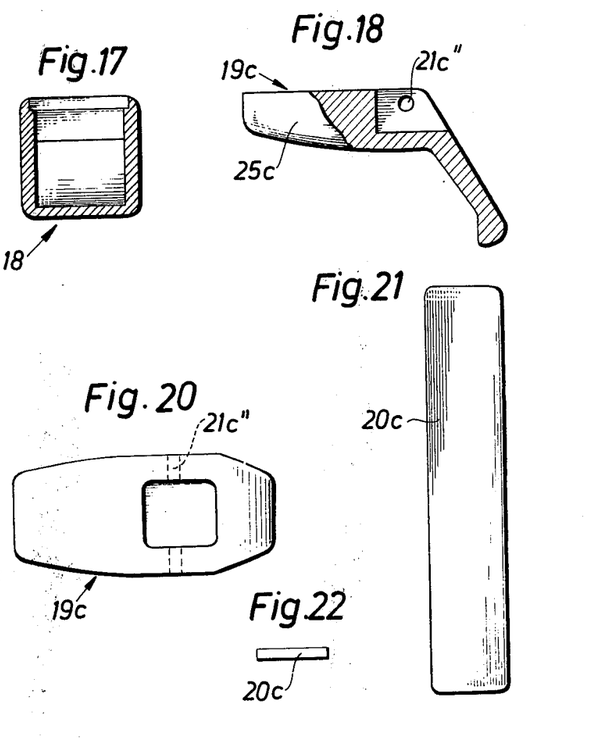
FIGS. 18–20 shows three views perpendicular to one another of a finger grip component adapted to the casing according to FIGS. 14–17.
FIGS. 21 and 22 in the same manner show two view perpendicular to one another of a lid adapted to the casing according to FIGS. 14–17.
Figure 19:
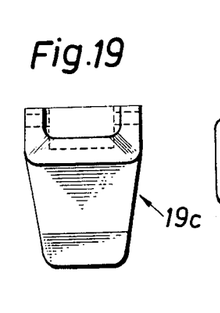

The construction shown consists of a first tong-half 18 which is illustrated in FIGS. 4–7 and a second tong-half 19 which is illustrated in FIGS. 8–10. Furthermore, a lid 20 is included which is shown in FIGS. 11–12.

The two tong-halves are mounted on each other with the help of an axle 21 and are normally retained in open position with the help of a spring 22. The tongs are thus closed against the effect of this spring. The tong-half 18 is provided at its front end, that is to say, the lower jaw 23, with a substantially V-shaped groove 24. In the same manner the other tong-half 19 is provided at its front end, that is to say, the upper jaw 25, with a corresponding projection 26. This V-shaped groove and this projection respectively are shown in the figures with constant cross-section. In practice, however, they are appropriately shaped so that their cross-section diminishes towards the interior of the jaw, so that they guide the contacts 9a and 10a of the measuring device 7a used even more securely to make contact with the corresponding contact surfaces inside the tong jaws. The latter contact surfaces are described in more detail in the following with reference to e.g. FIGS. 25 and 26. For the rest, FIGS. 3–12 should be sufficiently clear, so that no further detailed explanation is required.

PREFERRED EMBODIMENT OF THE SUBJECT OF THE INVENTION

FIG. 13 shows an embodiment of the subject of the invention which is preferred from a point of view of design. How this embodiment which is preferred from a point of view of design can be produced in practice should be evident from FIGS. 14–22, which show a similar technical construction, but of a somewhat modified shape.

The constructions according to FIGS. 13–20 correspond in essential parts to the construction according to FIGS. 3–12. Consequently, the same reference numerals have been used, but with the addition of the letter b in FIG. 13 and c in FIGS. 14–22.

The construction according to FIG. 13 thus consists of a square casing 18b which at its one end is closed by a lid 20b. At the front end of the casing 18b is mounted a finger-grip part 19b. The casing 18b moreover has a reading window 27b which forms part of a display unit present inside the device. Furthermore, the casing comprises an electric switch 28b which is operated when it is desired to read the temperature. At 29b finally an electric connection is indicated for the possible recharging of a battery arranged inside the device.

The construction according to FIGS. 14–22 also consists of a substantially square casing 18c and a grip part 19c. Moreover, a lid 20c is present.

The construction according to FIGS. 14–22 is intended mainly to be used together with the measuring device according to FIG. 2. It does not require, therefore, the same guidance of the measuring device as the device according to FIGS. 3–12. Consequently, there are no parts here corresponding to the V-shaped groove 24 and the V-shaped projection 26. The shape of the contacts is described in more detail in the following with reference to FIGS. 23 and 24.

The finger grip part 19c is mounted in the casing 18c with the help of an axle (not shown) which is intended to be introduced into the holes 21c' and 21c" respectively. Furthermore, the construction is to be provided with a spring (not shown) corresponding to the spring 22 in the construction according to FIG. 3. This spring is appropriately arranged in such a manner, however, that it normally holds the two jaws 23c and 25c closed against one another. The opening of the tongs thus has to take place against the effect of the spring force. Thus it will be this spring force which will produce a certain defined pressure on the contact surfaces of the measuring device used.

SUITABLE CONTACT SHAPES

Figure 23:
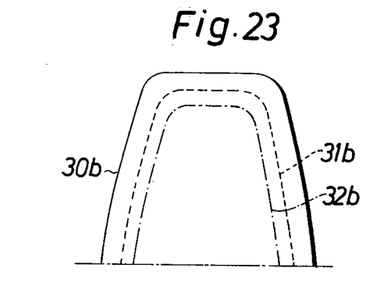
FIGS. 23 and 24 show schematically a shape of a contact suitable for the jaws on the construction shown in FIG. 13.
Figure 24:
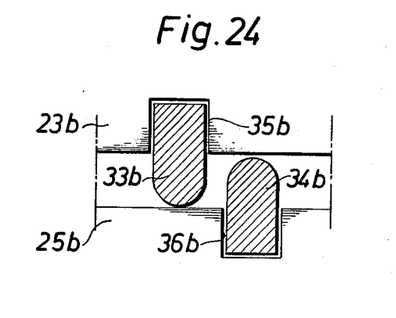

In FIGS. 23 and 24 a shape of the contact suitable for the construction according to FIG. 13 is described. Consequently reference numerals with the additional letter b are used. The same construction may also be used, however, in the embodiment according to FIGS. 14–22.

The line 30b indicates the outer contour for either the upper jaw 23b or for the lower jaw 25b. Numeral 31b indicates the contour of the contact surface of the lower jaw, whilst 32b designates the corresponding contact surface of the upper jaw.

The respective contact surfaces, as shown in FIG. 24, may consist of a strip 33b and 34b respectively arranged in a groove 35b and 36b respectively in the upper jaw 23b and in the lower jaw 25b respectively.

It is also conceivable to have a further U-shaped strip in the lower jaw inside the upper jaw. This design may also be used conversely, so that two strips are placed in the upper jaw with a strip in the bottom jaw located in between.

The strip should be made of a non-oxidizing material which gives good electric contact with e.g. copper. Thus e.g. an outer layer of silver or gold may be used. Moreover, it is important that the realization is such that no unintentional short-circuiting in the circuits is obtained.

Figures 25, 26, 27, 28:
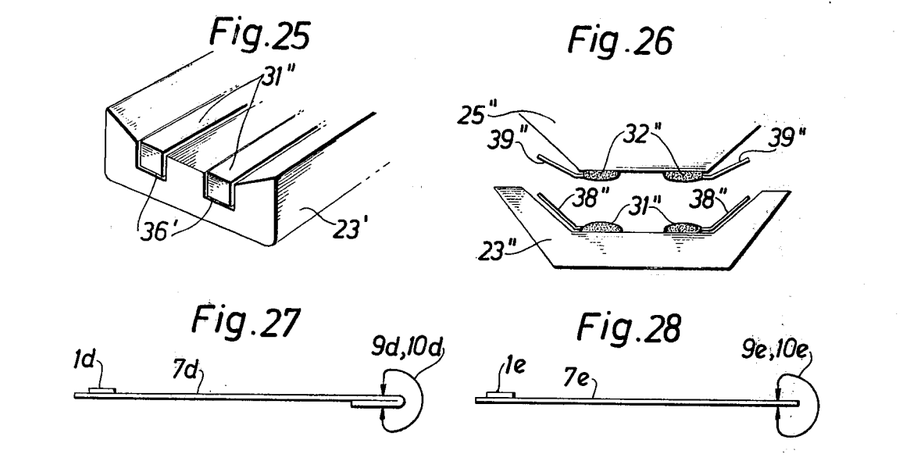
FIGS. 25 and 26 show other contact shapes which are more suitable for the construction according to FIGS. 3–12.
FIGS. 27 and 28 show a pair of simple alternatives especially for the measuring device shown in FIG. 1.

In FIG. 25 is shown how two electric conductors 31' can be placed in two grooves 36' in a lower jaw substantially corresponding to the lower jaw 23 in the embodiment according to FIGS. 3–12.

In FIG. 26 a further contact arrangement is shown which is suitable for the embodiment of the subject of the invention shown in FIGS. 3–12. Here the lower jaw is designated 23" and the upper one 25". Furthermore, the electric contacts in the lower half are designated 31" and those in the upper half 32". Thanks to the contact sheet 38" and 39" it is sufficient here to connect only the contacts 31" to the working circuit included in the construction. In spite of this the measuring device according to FIG. 1 can be introduced between the jaws 23" and 25" with its top side turned either upwards or downwards.

If it is desired to use the construction according to FIGS. 3–12, but with contacts only in the one jaw, the measuring device according to FIG. 1 can be modified in the manner as indicated in FIGS. 27 and 28. In the construction according to FIG. 27 the whole measuring device 7d is folded over at the end remote from the thermistor 1d, so that electric conductors 9d and 10d corresponding to 9a and 10a are present once again on both sides of the measuring device.

In the construction according to FIG. 28 it is instead the electric conductors 9e and 10e that are bent around the edge of the end of the measuring device 7e remote from the thermistor 1e.

Figure 29:
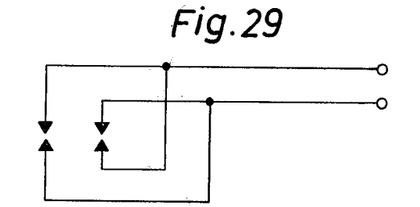
FIGS. 29–32 shows schematically four different alternative contact arrangements.
Figure 30:
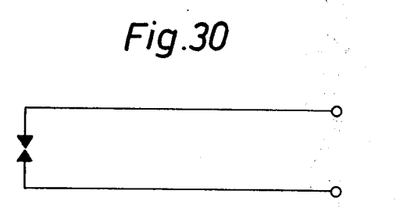
Figure 31:
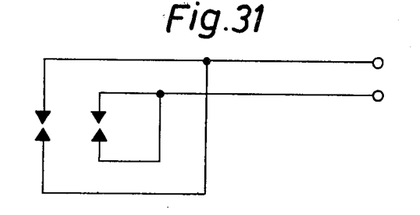
Figure 32:
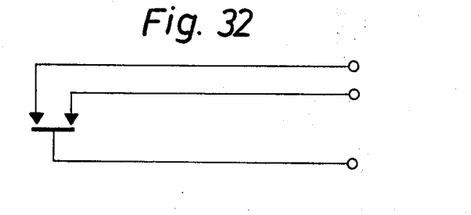

In FIGS. 29–32 different contact arrangements are shown schematically. FIGS. 29 and 31 correspond closest to that according to FIG. 26. In the same manner the construction according to FIG. 30 substantially corresponds to the contact arrangement according to FIGS. 23–24. FIG. 32 shows that it is also possible to have two contacts in the one jaw and a wider contact in the other jaw.

INTERNAL ELECTRIC EQUIPMENT

Figure 33:
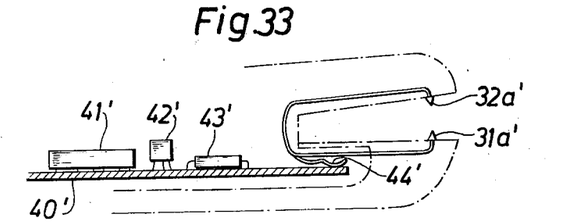
FIGS. 33 and 34 shows schematically how the different electrical components can be arranged in a simple manner so that they are readily exchangeable in the casing of the tonglike construction according to the invention.
Figure 34:
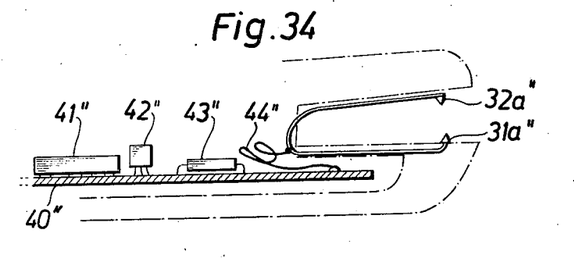

In FIGS. 33 and 34 is shown schematically how the internal electrical equipment may be arranged so that it is readily exchangeable on a board 40' and 40" respectively. The numerals 41', 41"; 42', 42" and 43', 43" indicate the parts included such as e.g. a microprocessor, a transistor and a resistor respectively. The board 40' is subsequently connected electrically to the contacts 31a' and 32a' via a spring sliding contact 44'. In a corresponding manner the board 40" is connected to the contacts 32a" and 31a" via a connection cable 44", which means that the electrical parts may be taken out of the casing without the contact with contacts 31a" and 32a" being broken.

Figure 35:
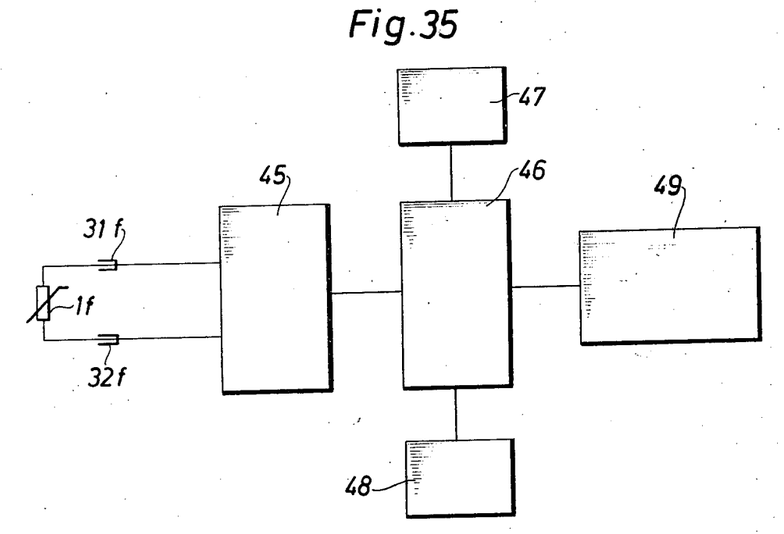
FIG. 35 finally shows a schematic wiring diagram for the electric equipment present.

In FIG. 35 finally a simple wiring diagram of the electric system as a whole is shown.

Numeral 1f designates the thermistor which forms part of the measuring device. 31f and 32f designate the contact surfaces on the measuring device used as well as the corresponding contact surfaces in the respective tong jaws. Numeral 45 designates a tuning and supply component which transmits a low current through 1f to measure the resistance of the same which varies with the temperature. The value obtained is tuned in the form of a signal to a processor 46 which may be said to constitute a small micro-computer. This micro-computer contains e.g. a clock and an arithmetic element which can be programmed for different programmes, e.g. for measurement in °C. or in °F. The correct programme is selected with the help of a control unit 47. Numeral 48 designates an actuating button which is operated when reading is required. The value finally obtained is shown on a display unit 49. The source of energy required, e.g. a battery, may be included e.g. in part 45. Alternatively, it can be arranged separately and be connected in a suitable manner to the remaining parts of the system.

The component parts 45-49 may be varied in their construction and function within wide limits. It would serve no purpose therefore to describe these parts in greater detail. Anybody versed in the art who wishes to pursue the invention only needs to specify his wishes to a supplier of such parts, so that the latter can then "tailor-make" the parts in accordance with the wishes specified.

Naturally, the invention is not limited merely to the embodiments described above, but it can be varied within the scope of the following claims. For example, as an alternative to the thermistor 1 (1a) a thermocouple can be used, whose electromotive force varies with the temperature.

We claim:

1. Apparatus adapted to grip a temperature-sensing device and to determine the value of a temperature sensed by the temperature-sensing device, which device includes a temperature-sensitive sensor having electrical properties which vary with temperature, a pair of electrical conductors, and a pair of contacts connecting the electrical conductors to the temperature-sensitive sensor, the electrical conductors terminating remote from the temperature-sensitive sensor in a pair of contact surfaces, said apparatus comprising a tong-like device having a pair of jaws; a pair of contacting means located on at least one of said jaws for contacting the pair of contact surfaces; converting means for converting a temperature sensed by the temperature-sensing device to a readable temperature value, said converting means including an electrical circuit which includes said pair of contacting means, a source of energy, and displaying means for displaying said readable temperature value when the temperature-sensing device is gripped by said tong-like device such that said pair of contacting means contacts the pair of contact surfaces, and guiding means for guiding the pair of contact surfaces into contact with said pair of contacting means, said guiding means including a substantially V-shaped groove formed on an inner surface of one of said jaws and a substantially V-shaped projection formed on the other of said jaws.

2. Apparatus according to claim 1, wherein said groove has a width which is a first dimension at an outer edge of said one jaw and a second dimension, which is less than said first dimension, at an interior point on said one jaw, said second dimension being substantially equal to the width of the temperature-sensing device, whereby the width of said groove decreases from said outer edge of said one jaw to said inner point on said one jaw, and said projection has a width which is a third dimension at a peripheral edge of said other jaw and a fourth dimension, which is less than said third dimension, at an interior location on said other jaw, said fourth dimension being substantially equal to the width of the temperature-sensing device, whereby the width of said groove decreases from said peripheral edge of said other jaw to said interior location on said other jaw.

3. Apparatus adapted to grip a temperature-sensing device and to determine the value of a temperature sensed by the temperature-sensing device, which device includes a temperature-sensitive sensor having electrical properties which vary with temperature, a pair of electrical conductors, and a pair of contacts connecting the electrical conductors to the temperature-sensitive sensor, the electrical conductors terminating remote from the temperature-sensitive sensor in a pair of contact surfaces, said apparatus comprising a tong-like device having a pair of jaws; a pair of contacting means located on at least one of said jaws for contacting the pair of contact surfaces; converting means for converting a temperature sensed by the temperature-sensing device to a readable temperature value, said converting means including an electrical circuit which includes said pair of contacting means, a source of energy, and displaying means for displaying said readable temperature value when the temperature-sensing device is gripped by said tong-like device such that said pair of contacting means contacts the pair of contact surfaces; and urging means, including a spring, for urging one of said jaws towards the other of said jaws, whereby said urging means cooperates with said jaws to couple the temperature-sensing device to said tong-like device.

4. Apparatus adapted to grip a temperature-sensing device and to determine the value of a temperature sensed by the temperature-sensing device, which device includes a temperature-sensitive sensor having electrical properties which vary with temperature, a pair of electrical conductors, and a pair of contacts connecting the electrical conductors to the temperature-sensitive sensor, the electrical conductors terminating remote from the temperature-sensitive sensor in a pair of contact surfaces, said apparatus comprising a tong-like device having a pair of jaws; a pair of contacting means located on at least one of said jaws for contacting the pair of contact surfaces; converting means electrically connected to said pair of contacting means for converting a temperature sensed by the temperature-sensing device to a readable temperature value, said converting means including an electrical circuit which includes a source of energy and displaying means, including a display window, for displaying said readable temperature value when the temperature-sensing device is gripped by said tong-like device such that said pair of contacting means contacts the pair of contact surfaces; housing means attached to one of said jaws for housing said converting means; and a finger grip attached to the other of said jaws, said finger grip being spring-mounted to said housing means.

5. Apparatus adapted to grip a temperature-sensing device and to determine the value of a temperature sensed by the temperature-sensing device, which device includes a temperature-sensitive sensor having electrical properties which vary with temperature, a pair of electrical conductors, and a pair of contacts connecting the electrical conductors to the temperature-sensitive sensor, the electrical conductors terminating remote from the temperature-sensitive sensor in a pair of contact surfaces, said apparatus comprising a tong-like device having a pair of jaws, a pair of contacting means located on at least one of said jaws for contacting said pair of contact surfaces, and converting means housed in said tong-like device and electrically connected to said pair of contacting means for converting a temperature sensed by the temperature-sensing device to a readable temperature value, said converting means including an electrical circuit which includes a source of energy and displaying means for displaying said readable temperature value when the temperature-sensing device is gripped by said tong-like device such that said pair of contacting means contacts the pair of contact surfaces.

6. Apparatus according to claim 5, wherein both of the electrical conductors are arranged on a first side of the temperature-sensing device and said pair of contacting means includes first and second electrical contacts provided on one of said jaws and third and fourth electrical contacts provided on the other of said jaws, whereby the contact surfaces of the temperature-sensing device are contactable by said first and second electrical contacts when the temperature-sensing device is gripped by said tong-like device such that said one jaw is adjacent to the first side of the temperature-sensing device and the contact surfaces of the temperature-sensing device are contactable by said third and fourth electrical contacts when said tong-like device grips the temperature-sensing device such that the first side of the temperature-sensing device is adjacent to said other jaw of said tong-like device.

7. Apparatus according to claim 5, wherein the electrical conductors are arranged on opposite sides of the temperature-sensing device and said pair of contacting means includes a first electrical contact on one of said jaws and a second electrical contact on the other of said jaws.

8. Apparatus according to claim 5, wherein said tong-like device further includes guiding means for guiding said pair of contacting means into contact with the contact surfaces of the temperature-sensitive device.

9. Apparatus for contacting a temperature-sensing device and for determining the value of a temperature sensed by the temperature-sensing device, which device includes a temperature-sensitive sensor having electrical properties which vary with temperature and first and second electrical conductors connected to the temperature-sensitive sensor, the first and second electrical conductors having first and second contact surfaces, respectively, said apparatus comprising a pair of jaws, first and second contacting means mounted on one of said jaws for contacting said first and second contact surfaces, respectively, and means electrically connected to said first and second contacting means for receiving an output from the temperature-sensing device and converting said output to a temperature value.

10. Apparatus for contacting a temperature-sensing device and for determining the value of a temperature sensed by the temperature-sensing device, which device includes a temperature-sensitive sensor having electrical properties which vary with temperature and first and second electrical conductors connected to the temperature-sensitive sensor, the first and second conductors having first and second contact surfaces, respectively, said apparatus comprising a tong-like gripping device having a pair of jaws and actuating handles operable to close said jaws so as to grip the first and second electrical conductors of the temperature-sensing device and to open said jaws so as to release the first and second electrical conductors of the temperature-sensitive device, first and second contacting means provided on said jaws for contacting said first and second contact surfaces, respectively, and means electrically connected to said first and second contacting means for receiving an output from the temperature-sensing device and converting said output to a temperature value.

11. Apparatus for contacting a temperature-sensing device and for determining the value of a temperature sensed by the temperature-sensing device, which device includes a temperature-sensitive sensor having electrical properties which vary with temperature and first and second electrical conductors connected to the temperature-sensitive sensor, the first and second conductors having first and second contact surfaces, respectively, said apparatus comprising a pair of jaws manually movable between a first position in which said jaws grip the temperature-sensing device and a second position in which said jaws release the temperature-sensitive device, said jaws being movable between said first and second positions without cooperation from the temperature-sensitive device, first and second contacting means provided on at least one of said jaws for contacting the first and second contact surfaces, respectively, when said jaws are in said first position, receiving and converting means electrically connected to said first and second contacting means for receiving an output signal generated by the temperature-sensing device in response to a temperature sensed thereby and converting said output signal to a temperature value, and housing means formed integrally with one of said jaws for housing said receiving and converting means.

12. Apparatus according to claim 11, wherein said one jaw includes said first contacting means and the other of said jaws includes said second contacting means.

13. Apparatus according to claim 11, wherein said first contacting means includes a first pair of electrical contacts provided on said one jaw and said second contacting means includes a second pair of electrical contacts provided on the other of said jaws, each of said first and second pairs of electrical contacts being contactable with the first and second contact surfaces of the temperature-sensitive device.

14. Apparatus according to claim 11, wherein said one jaw includes both of said first and second contacting means.

15. Apparatus according to claim 11, further comprising a tong-like gripping device having a first actuating handle formed integrally with said one jaw and said housing means and a second actuating handle formed integrally with the other of said jaws, said actuating handles being operable to close said jaws so as to grip the first and second electrical conductors of the temperature-sensing device and to open said jaws so as to release the first and second electrical conductors of the temperature-sensing device.

16. Apparatus according to claim 11, wherein said receiving and converting means includes a microprocessor for converting said output signal to a readable temperature value and displaying means for displaying said readable temperature value.

17. Apparatus according to claim 11, wherein said receiving and converting means further includes a source of energy.

18. Apparatus for contacting a temperature-sensing device and for determining the value of a temperature sensed by the temperature-sensing device, which device includes a temperature-sensitive sensor having electrical properties which vary with temperature and first and second electrical conductors connected to the temperature-sensitive sensor, the first and second conductors having first and second contact surfaces, respectively, said apparatus comprising a pair of jaws; first and second contacting means provided on at least one of said jaws for contacting the first and second contact surfaces, respectively, said jaws being movable without cooperation from the temperature-sensitive device between a first position in which said first and second contacting means contact the first and second contact surfaces, respectively, and a second position in which said first and second contacting means do not contact the first and second contact surfaces, respectively; receiving and converting means electrically connected to said first and second contacting means for receiving an output signal generated by the temperature-sensing device in response to a temperature sensed thereby and converting said output signal to a temperature value; and housing means for housing at least a portion of said receiving and converting means, said housing and said jaws forming a single portable unit.

19. Apparatus for contacting a temperature-sensing device and for determining the value of a temperature sensed by the temperature-sensing device, which device includes a temperature-sensitive sensor having electrical properties which vary with temperature and first and second electrical conductors connected to the temperature-sensitive sensor, the first and second conductors having first and second contact surfaces, respectively, said apparatus comprising a pair of jaws; first and second contacting means provided on at least one of said jaws for contacting the first and second contact surfaces, respectively, said jaws being movable between a first position in which said jaws are spaced apart a distance substantially greater than the thickness of the temperature sensing device and a second position in which said first and second contacting means contact the first and second contact surfaces, respectively; receiving and converting means electrically connected to said first and second contacting means for receiving an output signal generated by the temperature-sensing device in response to a temperature sensed thereby and converting said output signal to a temperature value; and housing means for housing at least a portion of said receiving and converting means, said housing and said jaws forming a single portable unit.

* * * * *